United States Patent Office
3,758,513
Patented Sept. 11, 1973

3,758,513
CYCLO-SUBSTITUTED GAMMA-BUTYROLACTONES
El Ahmadi I. Heiba, Princeton, and Ralph M. Dessau, Highland Park, N.J., assignors to Mobil Oil Corporation, New York, N.Y.
No Drawing. Continuation-in-part of applications Ser. No. 799,944, Feb. 17, 1969, now abandoned, and Ser. No. 30,582, Apr. 21, 1970, which is a continuation-in-part of abandoned application Ser. No. 714,447, Mar. 20, 1968. This application Aug. 31, 1971, Ser. No. 176,687
Int. Cl. C07d 5/34
U.S. Cl. 260—343.3       8 Claims

ABSTRACT OF THE DISCLOSURE

This specification discloses cyclo-substituted gamma-butyrolactones having the formula:

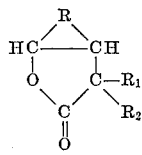

In this formula, R may be $(CH_2)_n$ wherein $n$ is a whole number and is at least 6 but not greater than 15, an alkylene group containing at least 3 but not more than 10 carbon atoms, or a butyrolactone connected through its beta and gamma carbon atoms with 1 to 8 —$CH_2$— groups interposed between either or both its beta or gamma carbon atoms. $R_1$ and $R_2$ may be hydrogen, chlorine, or a hydrocarbyl, carboxyl, amido, cyano, isocyano, or nitro group or may be an alkyl group substituted by any of the latter five groups. $R_1$ may be the same as or different from $R_2$. These lactones have various uses such as antiwear additives for hydrocarbon fuels, as inhibitors of oxygen corrosion of iron, and as a precursor for the preparation of antioxidants for hydrocarbon fuels and lubricants.

CROSS REFERENCE TO RELATED APPLICATIONS

This application is a continuation-in-part of copending applications Ser. Nos. 799,944, filed Feb. 17, 1969, and now abandoned, and 30,582, filed Apr. 21, 1970. This latter application is a continuation-in-part of application Ser. No. 714,447, filed Mar. 20, 1968, and now abandoned.

BACKGROUND OF THE INVENTION

Field of the invention

This invention relates to cyclo-substituted gamma-butyrolactones.

Description of the prior art

U.S. Pat. No. 3,101,347 discloses a gamma-butyrolactone having in one tautomeric form a=O substituent on the beta carbon atom and a $(CH_2)_9$ group bridging the alpha and gamma carbon atoms.

SUMMARY OF THE INVENTION

In accordance with the invention, there is provided a cyclo-substituted gamma-butyrolactone having the formula:

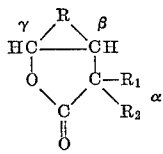

(1)

In the formula, R may be $(CH_2)_n$ wherein $n$ is a whole number and is at least 6 but not greater than 15, an alkylene group containing at least 3 but not more than 10 carbon atoms, or butyrolactone connected through its beta and gamma carbon atoms with 1 to 8 —$CH_2$— groups interposed between either or both its beta or gamma carbon atoms. $R_1$ and $R_2$ may be hydrogen or chlorine or a hydrocarbyl, carboxyl, amido, cyano, isocyano, or nitro group. They may also be an alkyl group containing as a substituent a carboxyl, amido, cyano, isocyano, or nitro group. Where $R_1$ and $R_2$ are groups containing carbon, they may contain between 1 and 16 carbon atoms. $R_1$ may be the same as or different from $R_2$. In the formula above, the alpha, beta, and gamma carbon atoms are labeled.

DESCRIPTION OF THE PREFERRED EMBODIMENTS

The lactones of the present invention can be prepared employing the process described in copending application Ser. No. 30,582, filed Apr. 21, 1970. In this process, a solution containing an olefin is heated for a period of time with a carboxylic acid in the presence of a metal ion of higher valent form such as trivalent manganese ion. The carboxylic acid must contain at least one hydrogen atom on the alpha carbon atom. The reaction may be carried out by heating to temperatures between 80° C. and 100° C. The time of reaction may be an hour or less to 5 or 10 hours or more. An inert atmosphere, such as one of nitrogen, carbon dioxide, helium, and the like, is desirably maintained over the reaction mixture to lessen or avoid oxidation by air. The solvent for the solution, in which the compound of the metal must also be soluble, is preferably an alpha-hydrogen-containing aliphatic carboxylic acid, of which acetic acid is preferred, but which may also be propionic, butanoic, pentanoic, or other higher molecular weight acid. The acid is preferably saturated but may be unsaturated and may have a straight or branched chain. Anhydrides and esters of these acids, aliphatic ethers, and aliphatic hydrocarbons may also be employed as solvents. Besides manganese, other higher valent metal ions such as cerium, vanadium, and nickel may be employed. In the reaction mixture, the concentration of the olefin may range from 0.01 to 3 moles, preferably 0.25 to 1 mole, per mole of metal compound. The amount of carboxylic acid to be employed will be discussed later.

In the process of the copending application, the carboxylic acid reacts with the ion of the metal in higher valent form to form a free radical. Concomitantly, the ion of the metal is reduced to a lower valent form. Thus, where manganic ion, $Mn^{+3}$, is employed, it is reduced to manganous ion, $Mn^{+2}$. The free radical then reacts with the olefin to form the lactone.

For the preparation of the cyclo-substituted gamma-butyrolactones of the present invention, employing the process disclosed in the aforementioned copending application, the olefin employed is a cyclomonoolefin or a cyclopolyolefin. The cyclomonoolefins will contain at least 8 carbon atoms per molecule and up to 17 carbon atoms per molecule. The cyclopolyolefins will contain 5 or more carbon atoms per molecule and up to 12 carbon atoms per molecule.

The nature of the R group in the lactone will be determined by the olefin that is employed, i.e., whether a cyclomonoolefin or a cyclopolyolefin is employed, as will become more apparent later. Where R is to be $(CH_2)_n$, a cyclomonoolefin will be employed. Where R is to be an alkylene group, a cyclopolyolefin will be employed. Where R is to be a butyrolactone group, a cyclopolyolefin will also be employed.

Cyclomonoolefins which may be employed are cyclooctene, cyclononene, cyclodecene, cycloundecene, cyclododecene, cyclotridecene, cyclotetradecene, cyclopentadecene, cyclohexadecene, and cycloheptadecene.

Cyclopolyolefins which may be employed include cyclopentadiene-1,3; cyclohexadiene-1,3; cycloheptadiene-1,2; cyclooctadiene-1,3; cyclooctadiene-1,5; cyclononadiene-1,3; cyclodecadiene-1,3; cycloundecadiene-1,3; cyclododecadiene-1,5; cyclododecatriene-1,5,9; and cyclododecatetraene.

Of the cyclomonoolefins, cyclooctene is preferred and, of the cyclopolyolefins, cyclopentadiene-1,3 is preferred.

Further, for the preparation of the cyclo-substituted gamma-butyrolactones of the present invention, employing the process disclosed in the aforementioned copending application, any carboxylic acid having the formula

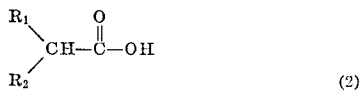
(2)

may be employed. In this formula, $R_1$ and $R_2$ may be hydrogen or chlorine. They may also be a hydrocarbyl, carboxyl, amido, cyano, isocyano, or nitro group. They may also be an alkyl group containing as a substituent a carboxyl, amido, cyano, isocyano, or nitro group. By "hydrocarbyl" group is meant any group containing only hydrogen and carbon and may be saturated or unsaturated. Representative hydrocarbyl groups are alkyl, aryl, alkaryl, aralkyl, and alkylene groups. Where $R_1$ and $R_2$ are groups containing carbon, they may contain between 1 and 16 carbon atoms. Acetic acid is the preferred carboxylic acid. $R_1$ may be the same as or different from $R_2$. $R_1$ and $R_2$ are preferably both hydrogen or both an alkyl group or one is hydrogen and the other is an alkyl group.

Before proceeding with further discussion concerning the carboxylic acids which may be employed, an explanation of the nature of the synthesis reaction disclosed in the aforementioned copending application would appear to be helpful. Assuming that the olefin is cyclooctene and the ion of higher valent form is trivalent manganese ion, the reaction is as follows:

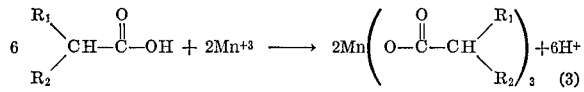

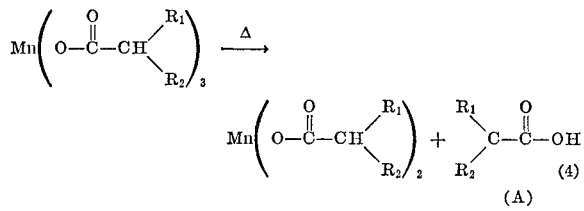

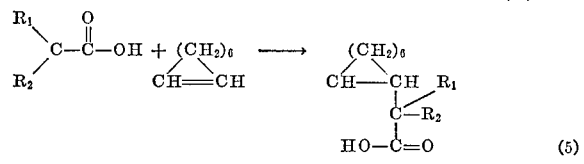

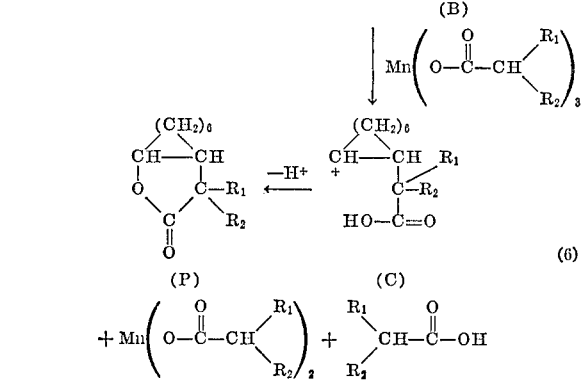

As shown in Equation 3, the carboxylic acid reacts with the manganic ion to form the manganic salt of the carboxylic acid. As shown in Equation 4, the free radical (A) is produced when the salt is heated. According to the reaction of Equation 5, which takes place in the presence of the reactant and products of Equation 4, the free radical adds to the double bond of the cyclooctene forming the free radical (B). The cation (C) then forms with reduction of $Mn^{+3}$ to $Mn^{+2}$, and the cation (C) loses a hydrogen ion to form the cyclo-substituted gamma-butyrolactone product (P).

It will be seen from the foregoing equations for the reaction that the $R_1$ and $R_2$ substituents on the alpha carbon atom of the lactone are the $R_1$ and $R_2$ substituents on the alpha carbon atom of the carboxylic acid. Accordingly, the $R_1$ and $R_2$ substituents on the alpha carbon atom of the lactone are determined by the $R_1$ and $R_2$ substituents on the carboxylic acid. Carboxylic acids wherein the $R_1$ and $R_2$ substituents are hydrogen, chlorine, or a hydrocarbyl, carboxyl, amido, cyano, isocyano, or nitro group or an alkyl group having as a substituent one or more of the latter five groups are readily available and any of these carboxylic acids may be employed.

Acetic acid is the preferred carboxylic acid. However, other acids, either saturated or unsaturated, straight or branched chain acids containing up to 16 carbon atoms may be employed. Thus, propionic, butanoic, pentanoic, hexanoic, heptanoic, octanoic, nonanoic, decanoic, undecanoic, dodecanoic, tridecanoic, tetradecanoic, pentadecanoic, and hexadecanoic acids may be employed. The corresponding unsaturated acids, namely, propenoic, butenoic, pentenoic, hexenoic, heptenoic, octenoic, nonenoic, decenoic, undecenoic, dodecenoic, tridecenoic, tetradecenoic, pentadecenoic, and hexadecenoic acids, may also be employed. With acetic acid, the substituents on the alpha carbon atom of the lactone will be hydrogen and with the other acids the substituents will be hydrogen and a hydrocarbyl group, i.e., an alkyl or alkenyl group, containing two less carbon atoms than the number of carbon atoms in the acid.

Various other acids may also be employed. For example, acids such as $Ph—CH_2—COOH$ (phenyl acetic acid) or $Ph—CH_2—CH_2—COOH$ (beta-phenylpropionic acid) may be employed in which case the substituents on the alpha carbon atom of the lactone will be hydrogen and an aryl group or alkaryl group, respectively. Further, for example, an acid such as $CH_3—Ph—CH_2—COOH$ (tolylacetic acid) may be employed in which case the substituents on the alpha carbon atom of the lactone will be hydrogen and an aralkyl group.

The acid employed may contain a chlorine substituent. For example, acetyl chloride or diacetyl chloride may be employed. With these acids, the substituents on the alpha carbon atom of the lactone will be hydrogen and chlorine or both will be chlorine, respectively. Acids such as chloropropanoic, chlorobutanoic, etc. may also be used in which case the substituents on the alpha carbon atom of the lactone will be hydrogen and an alkyl group containing chlorine as a substituent.

A dibasic acid may also be employed. For example, $HOOC—CH_2—COOH$ may be employed. With this acid, the substituents on the alpha carbon atom of the lactone will be hydrogen and —COOH, i.e., a carboxyl group. Other dibasic acids such as adipic and succinic acids may be employed and with these acids the substituents on the alpha carbon atoms of the lactone will be hydrogen and a $—CH_2—COOH$ or a $—(CH_2)_3—COOH$ group, respectively, i.e., carboxyl substituted alkyl groups. Other dibasic acids that may be employed include malonic acid, glutaric acid, suberic acid, and azelaic acid.

To prepare amido-substituted lactones, a monoamide of the above-mentioned dibasic acids is used.

A cyano-substituted acid may also be employed. For example, cyano acetic acid may be employed. With this acid, the substituents on the alpha carbon atom of the lactone will be hydrogen and a —CN group, i.e., a cyano group. With an acid such as cyanopropionic acid, etc., the substituents on the alpha carbon atom of the lactone will be hydrogen and —$CH_2$—CN, etc., i.e., cyano-substituted alkyl groups. Similarly, an isocyanic acid may be used such as isocyanoacetic or isocyanopropionic acid and the substituents on the alpha carbon atom of the lactone will be hydrogen and —C≡N or —$CH_2$—N≡C, respectively, i.e., an isocyano group or an isocyano-substituted alkyl group.

A nitro-substituted acid may also be employed. Thus, acids such as nitroacetic or nitropropionic acids may be employed. The substituents on the alpha carbon atom of the lactone with these acids will be hydrogen and a —$NO_2$ group or a —$CH_2$—$NO_2$ group, respectively, i.e., a nitro group or a nitro-substituted alkyl group.

As mentioned previously, the nature of the R group depends upon whether a cyclomonoolefin or a cyclopolyolefin is employed. Referring to Equations 3–6, it will be seen that where a cyclomonoolefin is employed, the R group is saturated and contains 2 less carbon atoms than the cyclomonoolefin. Where a cyclopolyolefin is employed, the R group will be unsaturated, i.e., will be an alkylene group, and will also contain 2 less carbon atoms than the cyclopolyolefin. Further, where a cyclopolyolefin is employed, isomeric forms of the lactone can be produced depending upon the orientation of the unsaturated bond or bonds of the alkylene group with respect to the beta and gamma carbon atoms of the lactone. Where the R group is to be a —(CH$_2$)$_n$ group or an alkylene group, and the lactone is produced by the procedure disclosed in the aforementioned copending application, the carboxylic acid is preferably present in an amount to provide one molecule per molecule of cyclomonoolefin or cyclopolyolefin. Where the R group is to be a butyrolactone connected through its beta and gamma carbon atoms with 1 to 8 —$CH_2$— groups interposed between either or both its beta or gamma carbon atoms, a cyclopolyolefin is also employed. This type of compound is produced by reaction of the acid with the unsaturated bond of the alkylene R group of the butyrolactone. Thus, for example, assuming acetic acid is reacted with cyclopentadiene-1,3, one of the isomeric lactones formed will have the formula:

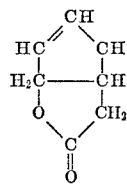

(7)

This can react with further acetic acid to form the following lactones;

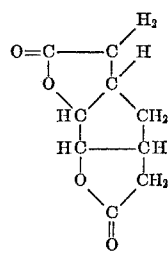

(8)

and

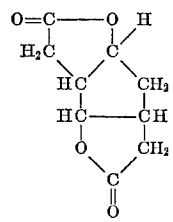

(9)

Accordingly, to form these compounds, the carboxylic acid is present in an amount to provide more than one molecule per molecule of cyclopolyolefin. Preferably, to form these compounds, the carboxylic acid is in an amount to provide at least two molecules per molecule of cyclopolyolefin. These compounds may also be prepared by removal of the lactone such as the lactone of Formula 7 from the reaction mixture and reacting the removed lactone with carboxylic acid in the presence of the metal of higher valent form.

The cyclo-substituted gamma-butyrolactones of the invention are useful as antiwear additives for hydrocarbon fuels. For example, wear is encountered in the fuel pump of jet engines. By addition to the fuel of the products of the invention, reduction of this wear is effected. Thus, by addition of 0.001 to 1.0% by weight of the cyclo-substituted gamma-butyrolactones of the invention to a hydrocarbon jet fuel, reduction in wear of the fuel pump is reduced.

The cyclo-substituted gamma-butyrolactones of the invention are also effective as inhibitors of oxygen corrosion of iron. Iron, in the presence of water and oxygen, can corrode, i.e., form iron oxide, rapidly. By addition to water in contact with iron in the presence of oxygen of 0.001 to 1.0% by weight of the cyclo-substituted gamma-butyrolactones of the present invention, corrosion of the iron is substantially inhibited.

The lactones of the invention are also useful as precursors for the preparation of antioxidants for hydrocarbon fuels and lubricants. Hydrocarbon fuels and lubricants can undergo deterioration from atmospheric oxygen. Thus, for example, a hydrocarbon fuel containing an unsaturated component can react with atmospheric oxygen whereby the unsaturated component reacts to form gums or other materials which interfere with the action of fuel pumps, carburetors, fuel injectors or other equipment involved in use of the fuel. Similarly, hydrocarbon lubricants such as greases and motor oils can react with atmospheric oxygen to produce compounds which reduce the effective use of the lubricant. The lactones of the invention may be used to prepare compounds which, when added to hydrocarbon fuels and lubricants, effectively reduce such oxidative deterioration. For example, the lactones may be reacted with an amine such as

to form:

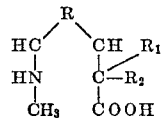

(10)

and

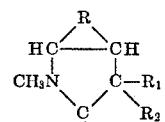

(11)

By further treatment of (10) with an amine $CH_3NH_2$, there may be formed:

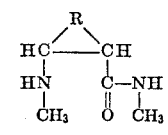

(12)

Compounds (10), (11), and (12) are effective antioxidants for hydrocarbon fuels and lubricants. A specific lactone which can be employed for preparing these antioxidants is the lactone of Example 1.

With respect to the above and subsequently mentioned uses of the lactones of the invention, the nature of the $R_1$ and $R_2$ substituents on the alpha carbon atoms has an insignificant effect on the uses of the lactones.

Lactones wherein R is an alkylene group, as for example, those shown in Examples 3 and 4 following, can be polymerized or copolymerized with other olefinic materials to form polymers or copolymers for fibre or other applications. Polymerization and copolymerization procedures can be those conventionally used for olefins and olefinic esters. For example, free radical systems such as peroxides, hydroperoxides, peresters, percarbonates, and azo-bisisobutyronitrile, and Ziegler catalysis can be employed.

The products of Examples 3 and 4 can be reacted with O,O-(dialkyl)phosphorodithioic acid to form an addition product which is useful as an antifriction additive for lubricating oils, insecticides, and herbicides.

Lactones of the invention wherein R is a butyrolactone can be hydrolyzed with an acid such as hydrochloric acid to form polyhydroxy, polycarboxylic acids which can be used for preparing alkyd resins. These resins may be formed by condensing the polyhydroxy, polycarboxylic acids with themselves or with other compounds such as glycols, including ethylene glycol, propylene glycol, glycerol, and pentaerythritol, or acids such as phthalic acid, azelaic acid, and adipic acid.

The following examples serve to illustrate the invention. All parts are by weight unless otherwise specified.

EXAMPLE 1

Cyclooctene is dissolved in glacial acetic acid to form a solution of approximately 0.1 molar with respect to the olefin. To such a solution there are added 2 mole equivalents of manganic acetate dihydrate, $$Mn(C_2H_3O_2)_3 \cdot 2H_2O$$

and about 300 grams per liter of anhydrous potassium acetate; the latter serves to suppress any undesired side product. The resulting solution is then heated to reflux under a nitrogen atmosphere until the brown manganic color disappears. Thereafter the resulting reaction mixture is analyzed for lactone content by means of vapor phase chromatography. The following lactone is obtained in a yield of 65% by weight:

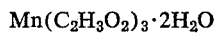

EXAMPLE 2

Cyclododecene can be substituted for cyclooctene in Example 1 and the resulting product comprises the following lactone:

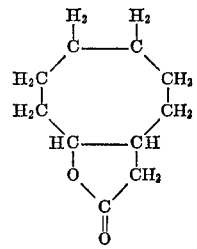

EXAMPLE 3

Manganic acetate dihydrate in the amount of 66.16 grams (0.24 mole) and 600 milliliters of 10% potassium acetate in acetic acid are charged to a 1.3 liter pyrex bomb. The resulting mixture is degassed by bubbling nitrogen through it for 20 minutes. Then 8.16 grams (0.12 mole) of cyclopentadiene - 1,3 are charged to the bomb. The bomb is sealed and is placed in a 160° C. oil bath for one hour. The bomb is removed from the bath and is cooled to room temperature (about 20° C.) and then is opened. Acetic acid is removed from the resulting reaction mixture by distilling the latter through a rotovac. The residue is taken up in 2.5 liters of water and is extracted succesively with 1000, 200, and 200 milliliters of diethyl ether. The ether layers are combined, dried over anhydrous $MgSO_4$, filtered, and evaporated.

The lactone product comprises a mixture of

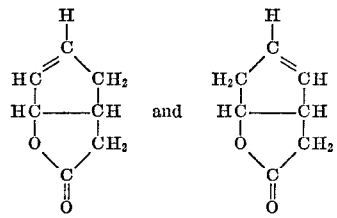

The products are identified by carbon and hydrogen analyses, infrared absorption and nuclear magnetic resonance.

EXAMPLE 4

Substitution of cyclohexadiene-1,3 for cyclopentadiene-1,3 in Example 3 provides a product containing a mixture of

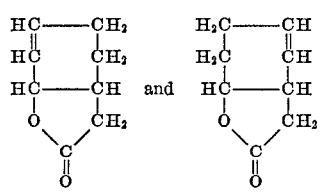

The products are identified as in Example 3.

We claim:

1. The lactone which has the formula

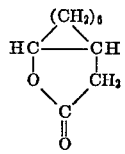

2. The lactone which has the formula

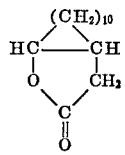

3. The lactone which has the formula

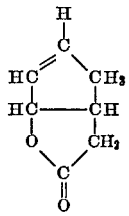

4. The lactone which has the formula

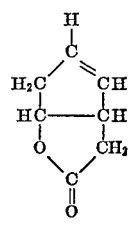

5. The lactone which has the formula
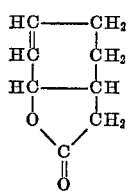
6. The lactone which has the formula
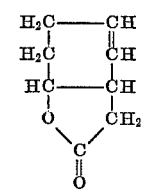
7. The lactone which the the formula
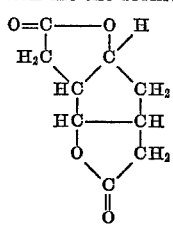
8. The lactone which has the formula
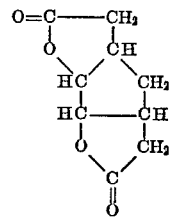
References Cited
UNITED STATES PATENTS
3,101,347  8/1963  Lyos et al. _____ 260—343.6
ALEX MAZEL, Primary Examiner
A. M. T. TIGHE, Assistant Examiner
U.S. Cl. X.R.
252—32.5, 407; 260—76, 326.8, 429 R, 439 R, 464, 514 R, 557 R, 999

UNITED STATES PATENT OFFICE
CERTIFICATE OF CORRECTION

Patent No. 3,758,513    Dated September 11, 1973

Inventor(s) El Ahmadi I. Heiba and Ralph M. Dessau

It is certified that error appears in the above-identified patent and that said Letters Patent are hereby corrected as shown below:

Column 2, line 2, after "or" insert --a--.

Column 3, product (A) portion of Equation (4) should read:

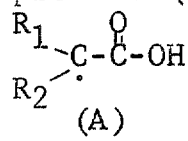

Column 3, the first portion of Equation (5) should read:

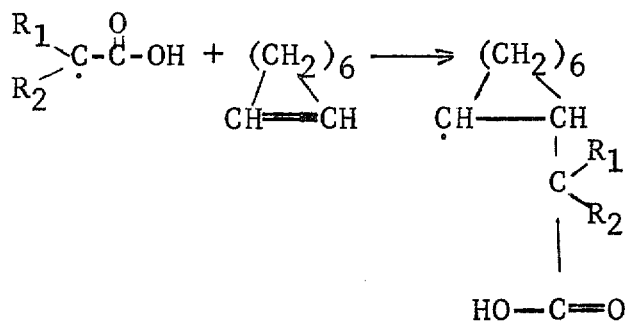

Column 4, line 66, "atoms" should be --atom--.

Column 6, Equation (10) should read:

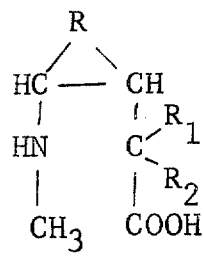

Signed and sealed this 18th day of December 1973.

SEAL)
ttest:

DWARD M. FLETCHER, JR.          RENE D. TEGTMEYER
ttesting Officer                 Acting Commissioner of Patents